US008750157B1

(12) United States Patent
Jagannath et al.

(10) Patent No.: US 8,750,157 B1
(45) Date of Patent: Jun. 10, 2014

(54) INSTALLATION AND SERVICE OF A WIRELESS HOME NETWORK

(71) Applicant: Quantenna Communications, Inc., Fremont, CA (US)

(72) Inventors: Ramanujam Jagannath, Cupertino, CA (US); Bahador Amiri, Los Gatos, CA (US); Sigurd Schelstraete, Menlo Park, CA (US); Qiang Wang, Fremont, CA (US); Steve Schultz, Danville, CA (US); Hossein Dehghan, Diablo, CA (US)

(73) Assignee: Quantenna Communications Inc., Fremont, CA (US)

( * ) Notice: Subject to any disclaimer, the term of this patent is extended or adjusted under 35 U.S.C. 154(b) by 0 days.

(21) Appl. No.: 14/099,899

(22) Filed: Dec. 6, 2013

Related U.S. Application Data

(60) Provisional application No. 61/845,320, filed on Jul. 11, 2013, provisional application No. 61/846,598, filed on Jul. 15, 2013.

(51) Int. Cl.
*H04L 12/26* (2006.01)

(52) U.S. Cl.
USPC .......... 370/252; 370/241; 370/254; 370/246; 370/247; 370/310

(58) Field of Classification Search
USPC ................. 370/310, 254, 252, 241, 246, 247
See application file for complete search history.

(56) References Cited

U.S. PATENT DOCUMENTS

| 7,142,106 | B2 | 11/2006 | Scoggins |
| 7,539,495 | B2 | 5/2009 | Kalika et al. |
| 7,725,122 | B1 * | 5/2010 | Balakrishnan et al. ........ 455/522 |
| 7,860,507 | B2 | 12/2010 | Kalika et al. |
| 8,248,948 | B2 * | 8/2012 | Weil et al. ..................... 370/237 |
| 8,503,336 | B2 * | 8/2013 | Rappaport et al. ............ 370/277 |
| 2006/0058062 | A1 | 3/2006 | Bhagwat et al. |
| 2009/0135731 | A1 | 5/2009 | Secades et al. |
| 2011/0211484 | A1 * | 9/2011 | Behroozi et al. ............. 370/252 |
| 2012/0106383 | A1 * | 5/2012 | Gormley et al. ............. 370/252 |
| 2012/0151035 | A1 * | 6/2012 | Puthenpura et al. .......... 709/224 |
| 2013/0054033 | A1 | 2/2013 | Casilli |

FOREIGN PATENT DOCUMENTS

EP 2066142 6/2009

* cited by examiner

*Primary Examiner* — Kenny Lin
(74) *Attorney, Agent, or Firm* — IP Creators; Charles C. Cary

(57) ABSTRACT

A diagnostic apparatus including a signal analyzer and a throughput projector for diagnosing a wireless home network. The signal analyzer analyzes wireless communication parameters at identifiable locations within a coverage area associated with the wireless home network. The throughput projector projects wireless throughput levels for at least one proposed wireless device differing in communication capabilities from the diagnostic apparatus at each of the identifiable locations, based on the communication parameters analyzed by the signal analyzer together with parameters which identify relative differences in communication capabilities of the diagnostic apparatus and the at least one proposed wireless device.

20 Claims, 9 Drawing Sheets

Diagnosing a WiFi Home Network

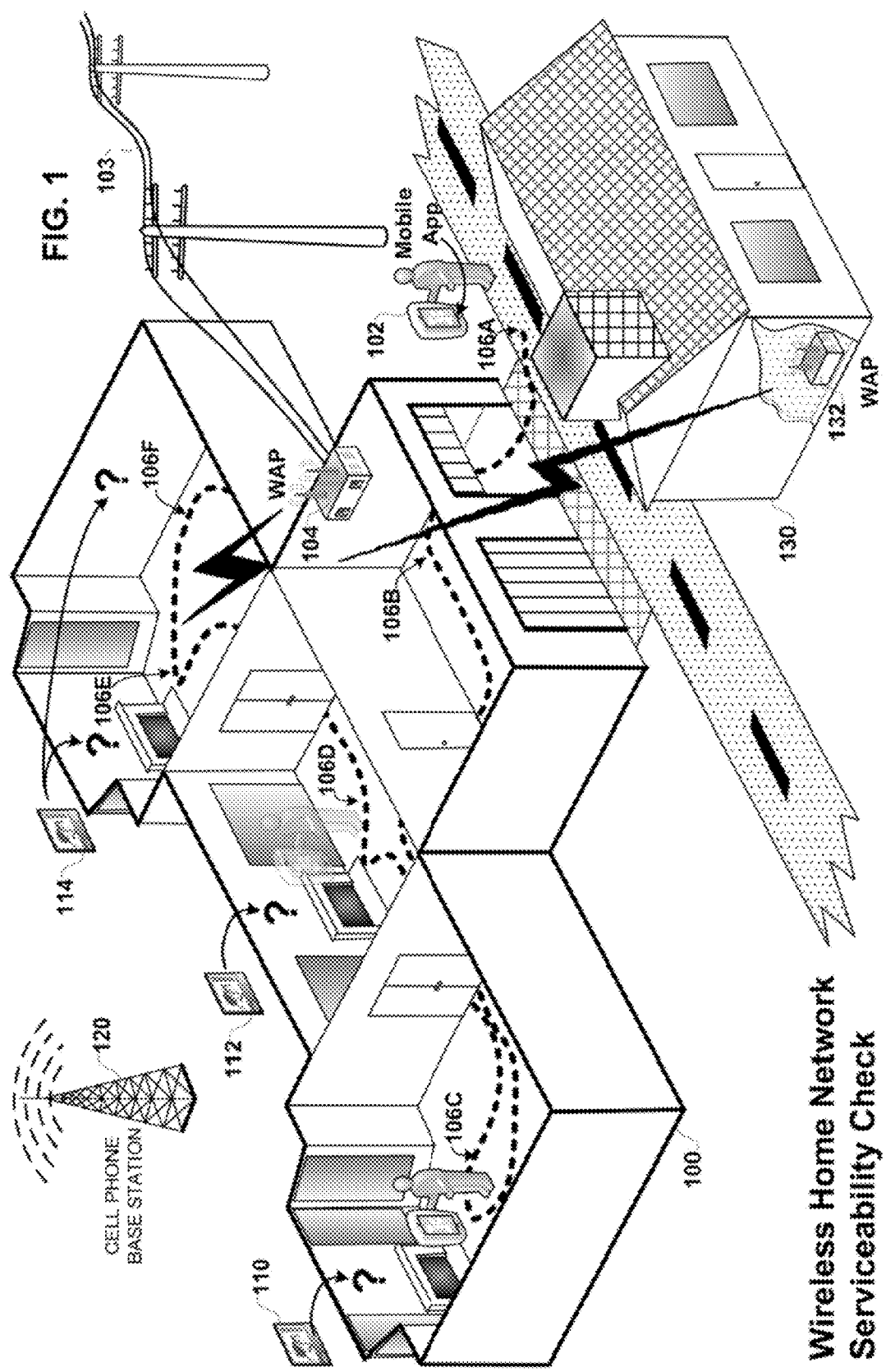

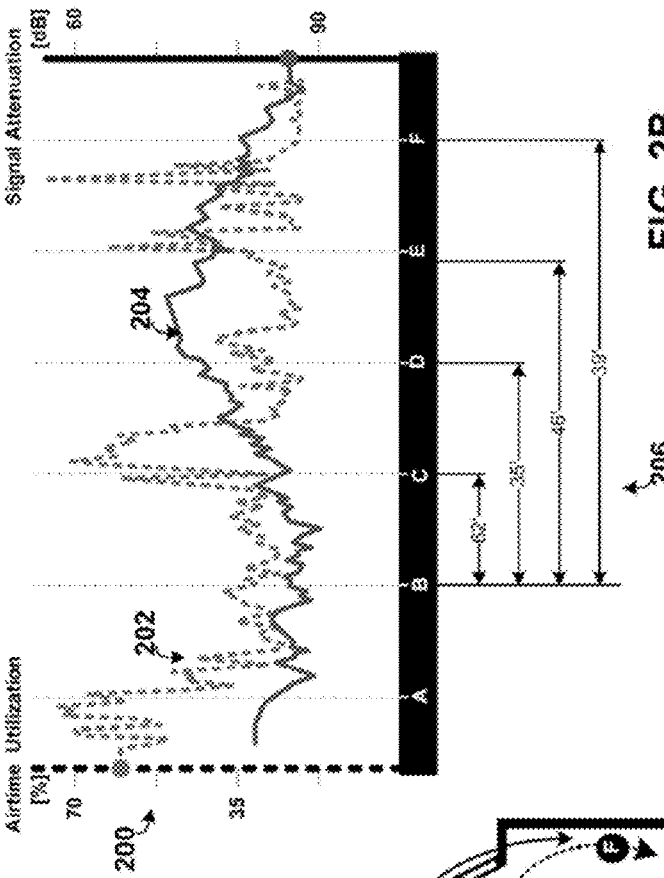
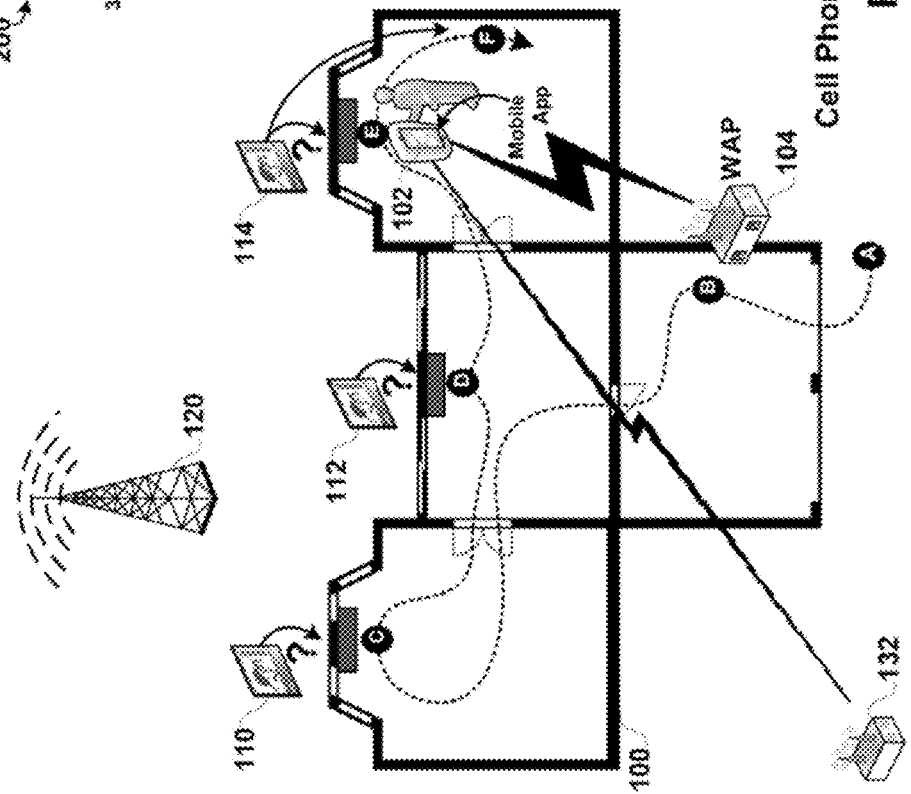
FIG. 2B
FIG. 2A

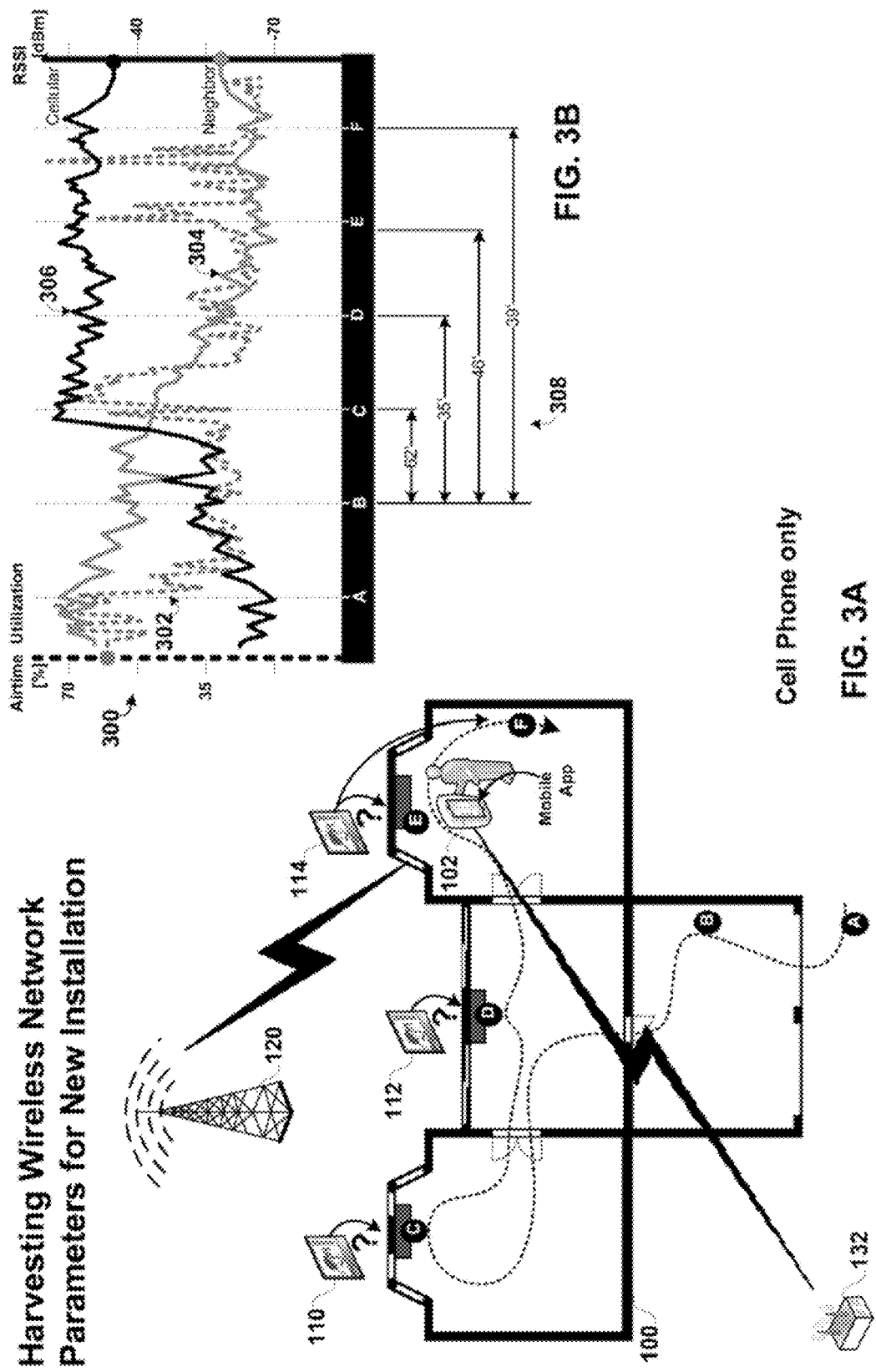

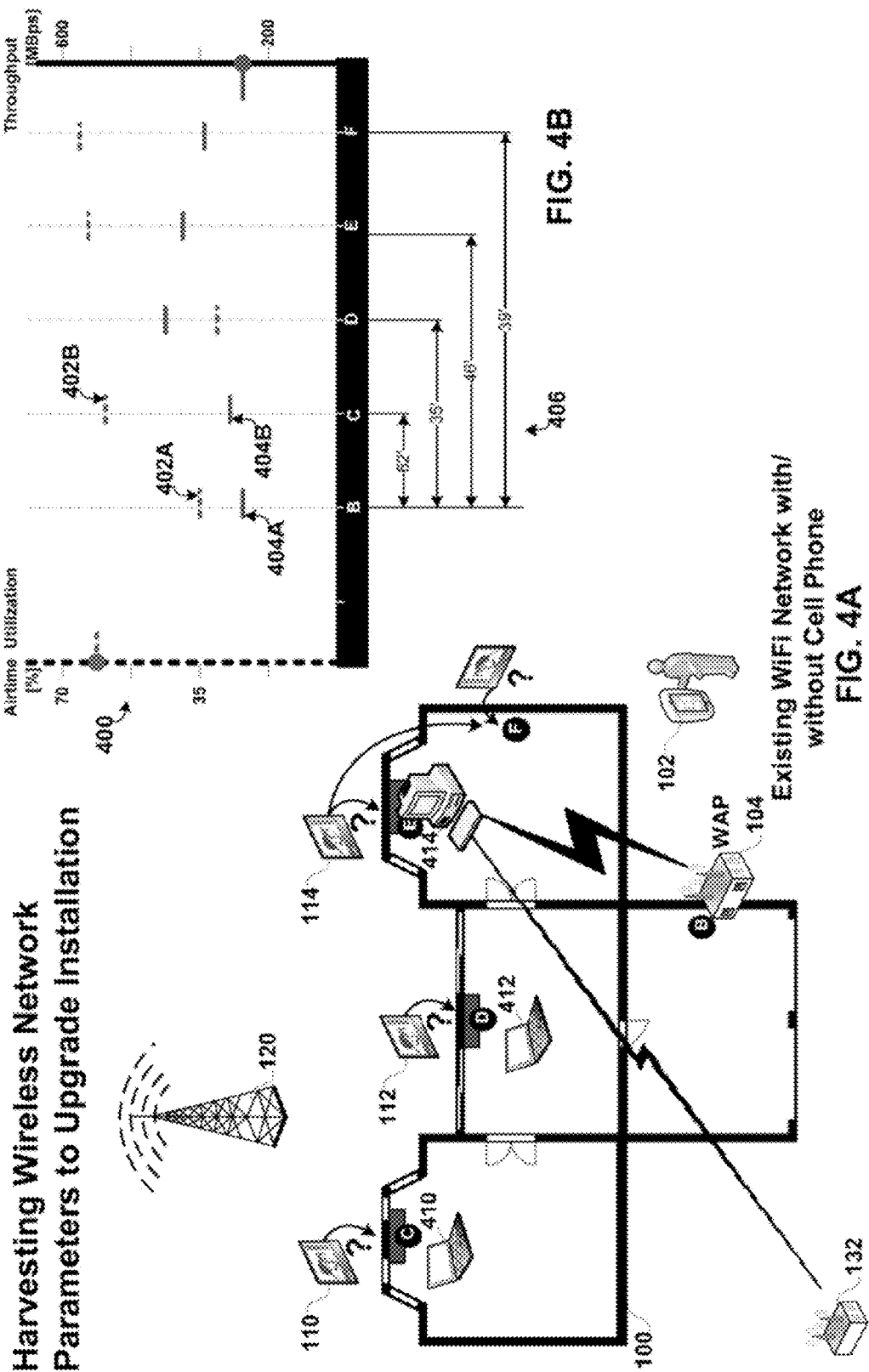

Conversion of Measured to Projected RSSI

Conversion of Projected RSSI to Throughput

Conversion of Measured to Projected Throughput

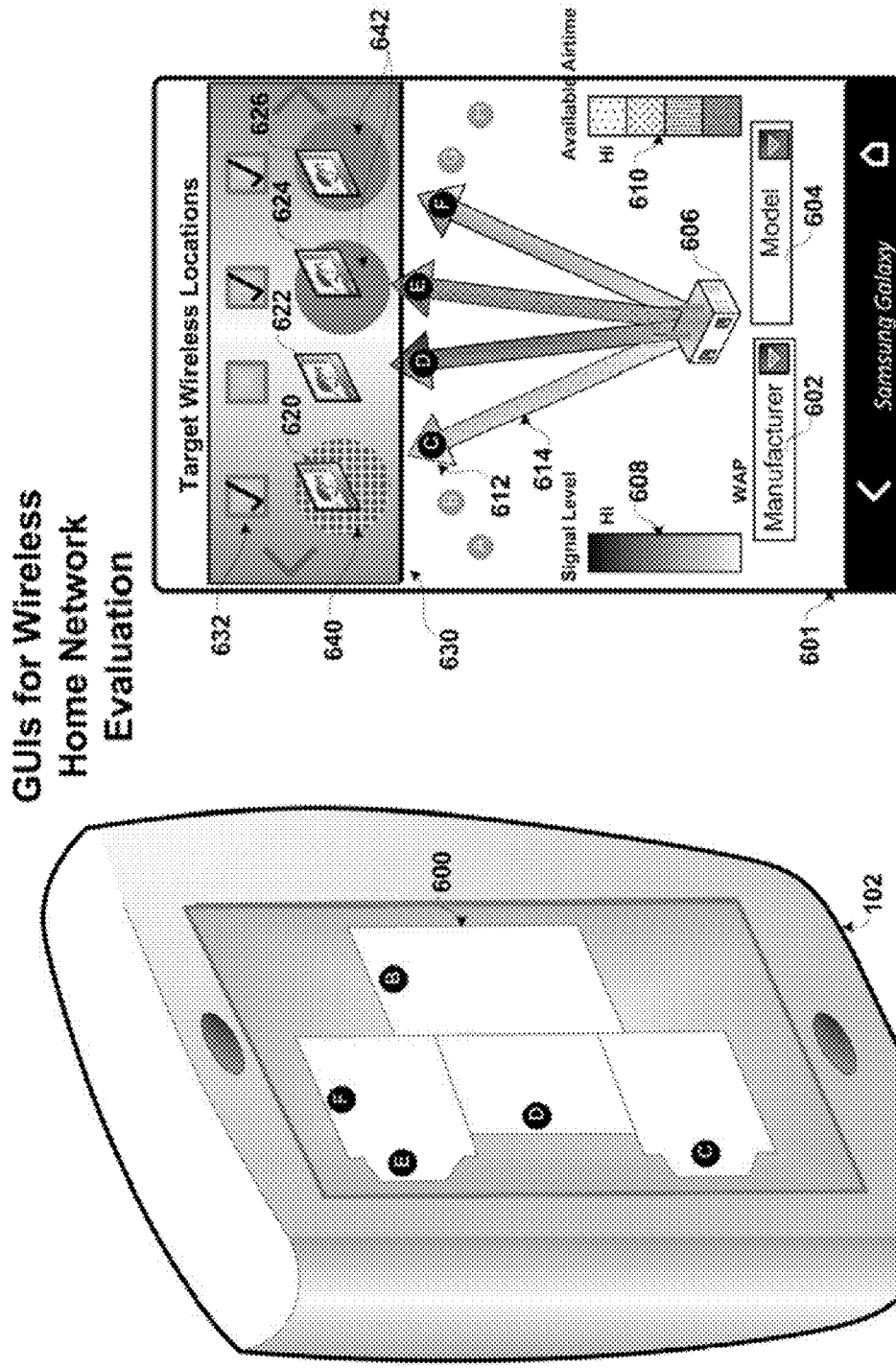

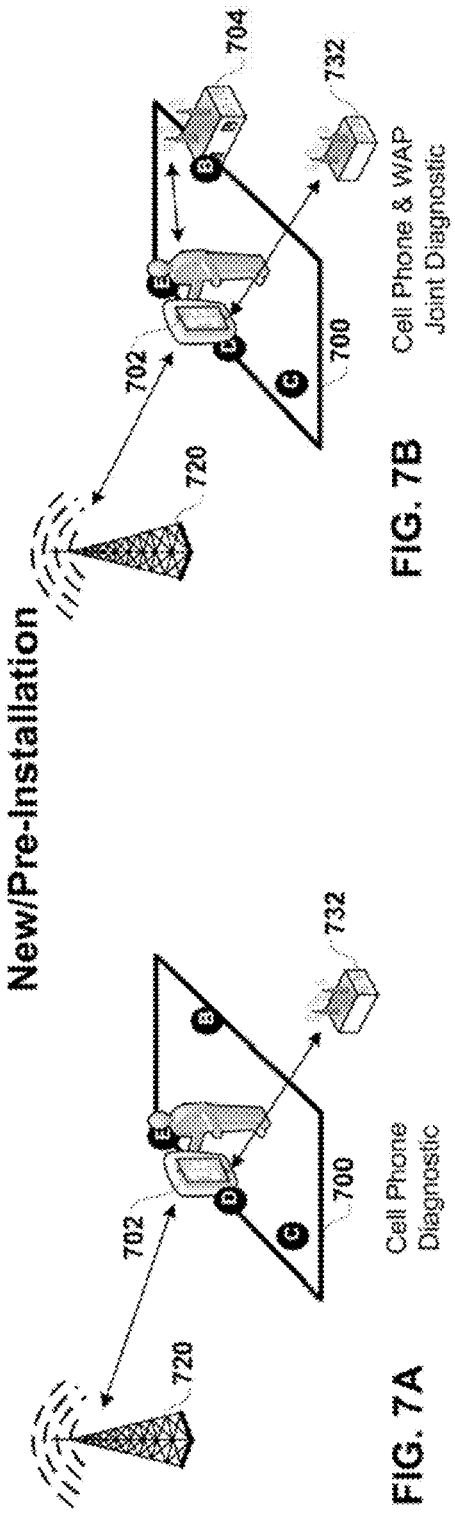
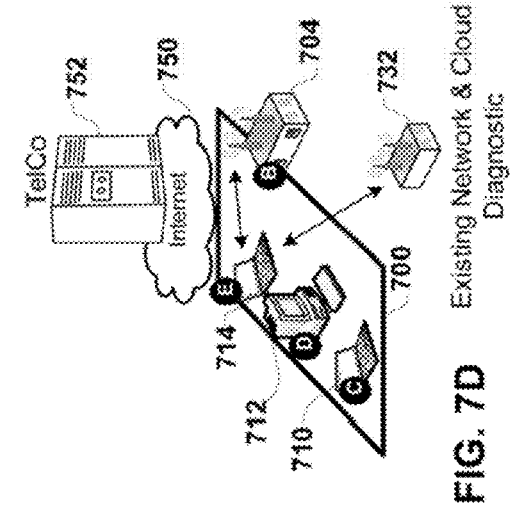
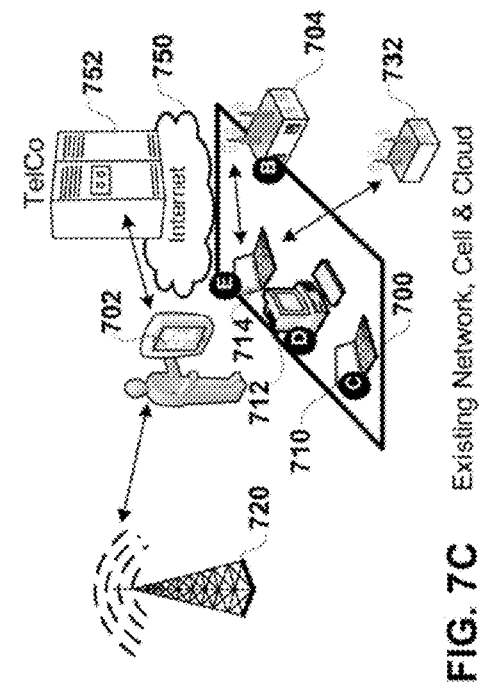
FIG. 7A  Cell Phone Diagnostic
FIG. 7B  Cell Phone & WAP Joint Diagnostic
FIG. 7C  Existing Network, Cell & Cloud Diagnostic
FIG. 7D  Existing Network & Cloud Diagnostic
New/Pre-Installation
WiFi Network Diagnostics
Existing Installation

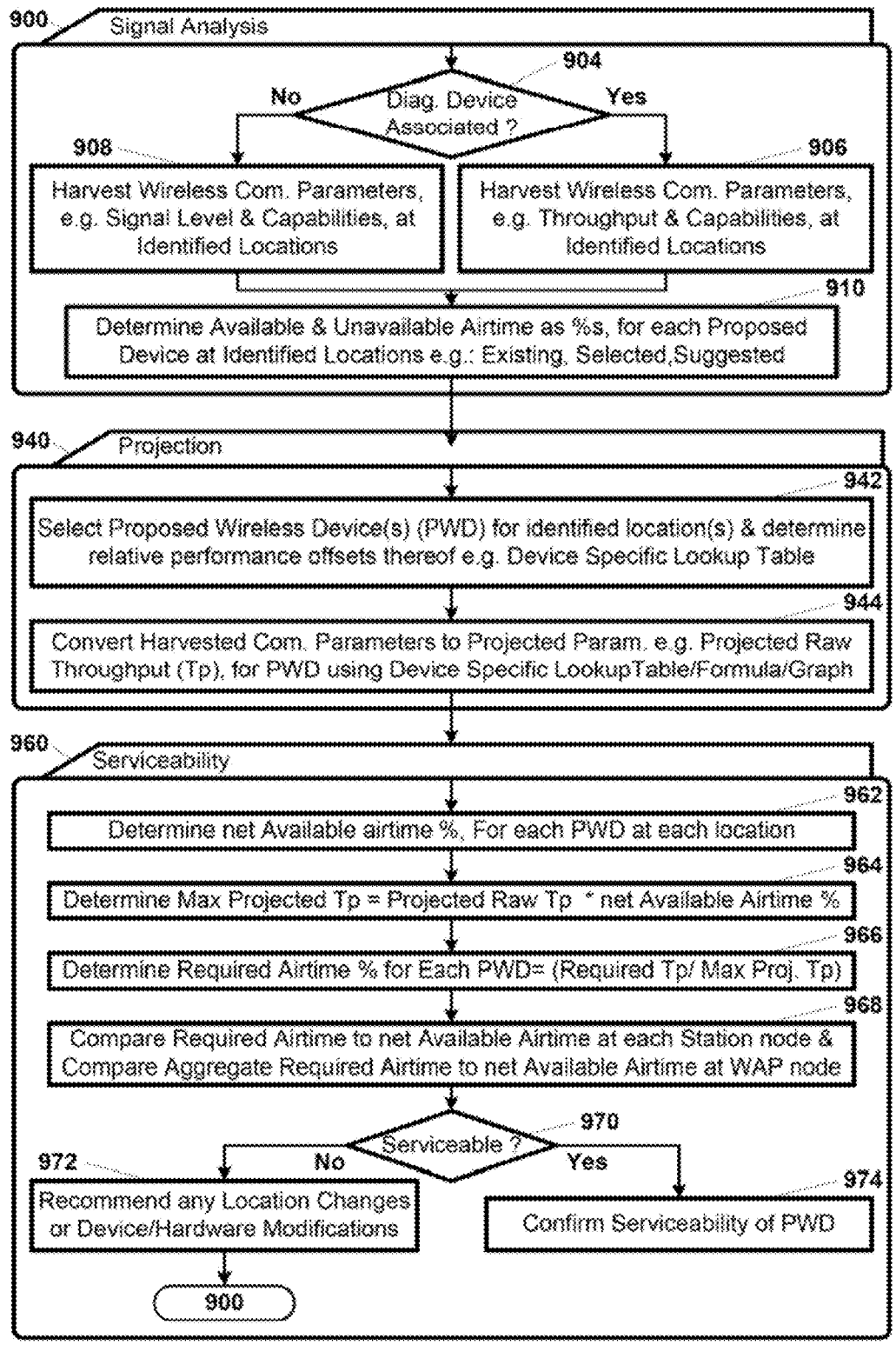
Diagnosing a WiFi Home Network      FIG. 9

INSTALLATION AND SERVICE OF A WIRELESS HOME NETWORK

CROSS REFERENCE TO RELATED APPLICATION

This application claims the benefit of prior filed co-pending Provisional Application No. 61/845,320 filed on Jul. 11, 2013 entitled "Method for Determining Optimal Position of Wi-Fi Devices for Video Distribution" and Provisional Application No. 61/846,598 filed on Jul. 15, 2013 entitled "Method for Installation and Service of a Wireless Home Network" both of which are incorporated herein by reference in their entirety as if fully set forth herein.

BACKGROUND OF THE INVENTION

1. Field of Invention

The field of the present invention relates in general to wireless local area networks including wireless access points (WAP) and wireless stations and methods for diagnosing same.

2. Description of the Related Art

Home and office networks, a.k.a. wireless local area networks (WLAN) are established serviced using a device called a Wireless Access Point (WAP). The WAP may include a router. The WAP wirelessly couples all the devices of the home network, e.g. wireless stations such as: computers, printers, televisions, digital video (DVD) players, security cameras and smoke detectors to one another and to the Cable or Subscriber Line through which Internet, video, and television is delivered to the home. Most WAPs implement the IEEE 802.11 standard which is a contention based standard for handling communications among multiple competing devices for a shared wireless communication medium on a selected one of a plurality of communication channels. The frequency range of each communication channel is specified in the corresponding one of the IEEE 802.11 protocols being implemented, e.g. "a", "b", "g", "n", "ac", "ad". Communications follow a hub and spoke model with a WAP at the hub and the spokes corresponding to the wireless links to each 'client' device.

After selection of a single communication channel for the associated home network, access to the shared communication channel relies on a multiple access methodology identified as Collision Sense Multiple Access (CSMA). CSMA is a distributed random access methodology first introduced for home wired networks such as Ethernet for sharing a single communication medium, by having a contending communication link back off and retry access to the line if a collision is detected, i.e. if the wireless medium is in use.

Communications on the single communication medium are identified as "simplex" meaning, one communication stream from a single source node to one or more target nodes at one time, with all remaining nodes capable of "listening" to the subject transmission. To confirm arrival of each communication packet, the target node is required to send back an acknowledgment, a.k.a. "ACK" packet to the source. Absent the receipt of the ACK packet the source will retransmit the unacknowledged data until an acknowledgement is received, or a time-out is reached.

Initially wireless home networks had limited indoor range and throughput of 20 feet and 1 Mbps respectively. As such they were limited to delivery of data, where inconsistencies in delivery, e.g. temporary outages or throughput shortfalls, are not noticeable. With improvements in range and throughput of 250 feet and 600 Mbps came the possibility of wireless delivery to low latency audio-video streams for consumer devices such as TVs. Each TV requires 5-30 Mbps in uninterrupted throughput for acceptable picture quality. Picture quality is extremely sensitive to placement of the wireless components, i.e. WAP, set top box and/or TV. Wireless content delivery to all rooms in a large house is not always possible. Also, once an installation has been made successfully, picture quality can degrade due to neighboring wireless networks in other apartments or condominiums or other forms of interference. Typically a Telco or other content provider will be compelled to send out a technician for pre or post installation diagnostic of a wireless local area network.

What is needed is an improved method of installing and operating a WLAN.

SUMMARY OF THE INVENTION

The present invention provides a method and apparatus for diagnostic device for a wireless home network. The wireless diagnostic device in an embodiment of the invention is a cell phone or similar mobile device executing a diagnostic application downloaded from an application store and running on the home owner's cell phone and using the cell phones wireless local area network (WLAN) and positioning capability to provide input to the application. In an embodiment of the invention a diagnostic apparatus for diagnosing a wireless home network is disclosed. The wireless diagnostic device includes a signal analyzer and a throughput projector. The signal analyzer analyzes wireless communication parameters at identifiable locations within a coverage area associated with the wireless home network. The throughput projector projects wireless throughput levels for at least one proposed wireless device differing in communication capabilities from the diagnostic apparatus at each of the identifiable locations, based on the wireless communication parameters analyzed by the signal analyzer together with parameters which identify relative differences in communication capabilities of the diagnostic apparatus and the at least one proposed wireless device.

The invention may be implemented in hardware, firmware or software.

Associated methods and computer readable media containing program instructions are also claimed.

BRIEF DESCRIPTION OF THE DRAWINGS

These and other features and advantages of the present invention will become more apparent to those skilled in the art from the following detailed description in conjunction with the appended drawings in which:

FIG. 1 is an isometric view of a home targeted for installation or servicing of a wireless network using the diagnostic device of the current invention;

FIGS. 2A and 2B are respectively a plan view of a home shown in FIG. 1 and a graph of wireless communication parameters obtained at identifiable locations within the home by the diagnostic device of the current invention;

FIGS. 3A and 3B are respectively a plan view of a home shown in FIG. 1 and a graph of wireless communication parameters obtained at identifiable locations within the home by the diagnostic device of an alternate embodiment of the current invention;

FIGS. 4A and 4B are respectively a plan view of a home shown in FIG. 1 and a graph of wireless communication parameters obtained at identifiable locations within the home by an alternate embodiment of the diagnostic device of the current invention;

FIGS. 6A and 6B are respectively an isometric view of a mobile diagnostic device and a graphical user interface of a diagnostic application configured to execute thereon, in accordance with an embodiment of the current invention;

FIGS. 7A, 7B, 7C and 7D are system diagrams of various systems for diagnosing a wireless home network in accordance with alternate embodiments of the invention;

FIG. 9 is a process flow diagram of processes associated with diagnosing a wireless home network in accordance with an embodiment of the invention.

DETAILED DESCRIPTION OF THE EMBODIMENTS

Figure 5A:
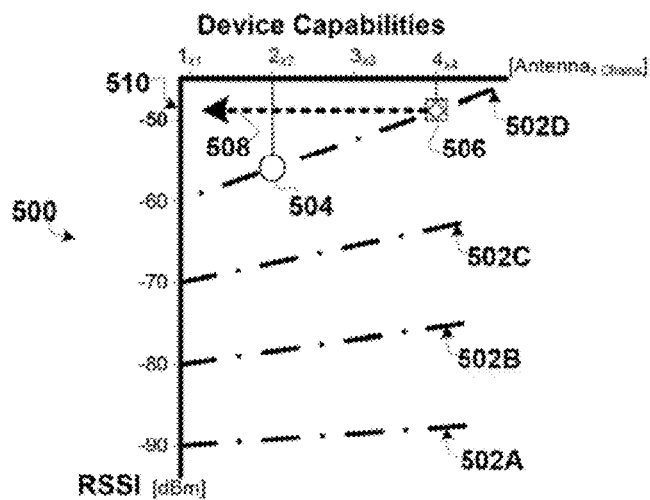
FIGS. 5A, 5B, 5C are graphs correlating parameters which identify relative differences in communication capabilities of the diagnostic apparatus and the at least one proposed wireless device.

The present invention provides a method and apparatus for diagnosing a wireless home network for pre and post installation service issues. An apparatus as ubiquitous as a home owner's cell phone can be configured to perform the diagnostics using a downloadable diagnostic application along with the cell phones existing wireless local area network (WLAN) and positioning capability to provide input to the application.

FIG. 1 is an isometric view of a home 100 targeted for installation or servicing of a wireless network using the diagnostic device of the current invention. A diagnostic application running on the homeowner's cell phone 102 is used for diagnosis. The cell phone couples to the cellular network via base station 120. The home includes a wireless access point 104 coupled to an Internet service provider (ISP) and content providers via a Telco infrastructure, e.g. telephone lines 103. Using the cell phone's as a diagnostic device, the user walks through the home identifying various locations, 106A, 106B, 106C, 106D, 106E, 106F, for the installation of three proposed wireless devices, e.g. HDTV's 110, 112, 114. Examples of other proposed wireless devices include but are not limited to: TVs, set top boxes, security cameras, wireless speakers, smoke detectors, wireless door bells, wifi enabled home appliances, wireless audio systems, wireless repeaters, wireless bridges, wifi enabled gaming consoles and wireless digital video recorders (DVR)s. The diagnostic device in communication with the WAP identifies the WAPs communication capabilities/parameters including: # of antennas, power, beamforming support, coding and decoding support, supported IEEE 802.11 protocols, e.g. e.g. "a", "b", "g", "n", "ac", "ad". In an embodiment of the invention the diagnostic device determines these capabilities from the beacon frame of the WAP and specifically the Information elements within each beacon frame. In another embodiment of the invention the diagnostic device probes the WAP with probe requests and determines the capabilities from the probe response frame.

Additionally at each location identified by the homeowner the homeowner's cell/smart phone configured as a diagnostic device also measures additional communication parameters of the WAP including at least one of: received signal strength (RSSI), range, throughput rate, Phy rate, path loss, attenuation etc. In an embodiment of the invention the homeowner taps on the cell phones screen to identify each location at which to harvest communication parameters. In another embodiment of the invention the diagnostic application running on the cell phone continuously harvests communication parameters during the homeowner's walkthrough of the residence.

Still further communication parameters are harvested by the mobile diagnostic device in the form of interference from one or more neighboring WLAN networks. Neighboring home 130 is shown with its own WLAN services by WAP 132. Interference arises when a neighboring wireless network selects the same one, or in some cases a spectrally neighboring one, among the 5-15 communication channels specified by the corresponding one of the IEEE 802.11 protocols. If the neighboring network is close enough, e.g. in an apartment or condominium, its use of the same selected communication channel as the homeowner's network reduces throughput on the homeowner's network. The diagnostic device measures this unavailable airtime at each of the identified locations.

At the end of the walkthrough of the homeowner's residence the diagnostic device projects the performance of the TV's based on the communications parameters harvested on the cell phone and on conversion tables which take into account the offsets or differences in receive capabilities of the diagnostic device, e.g. cell phone, and the proposed wireless device(s) to which service is actually to be delivered, e.g. the HDTVs 110,112, 114. The conversion tables, functions or graphs are retrieved by or stored within the cell phone by the diagnostic application. Once the conversion is complete the cell phone configured by the diagnostic application as a diagnostic device compares the projected throughput including airtime constraints, for the proposed device, e.g. TV, with the throughput required for the TV to perform properly.

If wireless service to a projected device at an identified location will meet required throughput levels then the diagnostic device will indicate serviceability as "PASS". Alternately, if projected wireless throughput rates at an identified location will not support a high quality TV picture then the diagnostic device will indicate serviceability as "FAIL". In an embodiment of the invention, if one indicated location fails serviceability then the diagnostic device will suggest proximate alternate locations which will improve TV service, e.g. location 106F instead of location 106E.

FIGS. 2A and 2B are respectively a plan view of a home 100 shown in FIG. 1 and a graph of wireless communication parameters obtained at identifiable locations within the home by the diagnostic device of the current invention. The identified locations on the walkthrough path shown in FIG. 2A are labeled: "A-F". Representative wireless communication parameters harvested by the diagnostic device are shown on the graph 200 in FIG. 2B.

The graph 200 in FIG. 2B shows identified locations A-F on the x axis, airtime utilization on the y axis left side, and signal attenuation on the y axis right side. Dashed line 202 shows airtime utilization, i.e. unavailable airtime percent, on the selected one of the communication channels at identified locations throughout the homeowner's residence 100. This unavailable airtime varies throughout the structure depending on the level of interference from the neighboring networks, e.g. WAP 132. Solid line 204 shows signal attenuation in decibels from the WAP 104 of the network being diagnosed, to the mobile diagnostic device at the identified locations throughout the residence. Best reception and highest throughput will be experienced at locations with the least interference and least signal attenuation, e.g. identified location "F". The range of each identified location in feet is indicated by dimension lines 206 below the x axis.

FIGS. 3A and 3B are respectively a plan view of a home shown in FIG. 1 and a graph of wireless communication parameters obtained at identifiable locations within the home by the diagnostic device of an alternate embodiment of the current invention. The identified locations on the walkthrough path are labeled: "A-F". In this embodiment of the invention the residence is empty, i.e. has no WLAN devices, neither client nor WAP. In this embodiment of the invention the diagnostic device determines the interference within the structure, and the relative permeability of each room of the structure to electromagnetic radiation from sources outside the home such as neighboring WLAN networks, e.g. WAP 132, and the cell phone base station 120. These communication parameters are then used to project performance of a WLAN using proposed wireless devices within the home. The identified locations on the walkthrough path shown in FIG. 3A are labeled: "A-F". Representative wireless communication parameters harvested by the diagnostic device are shown on the graph 300 in FIG. 3B.

The graph 300 in FIG. 3B shows identified locations A-F on the x axis, airtime utilization on the y axis left side, and signal attenuation on the y axis right side. Dashed line 302 shows airtime utilization, i.e. unavailable airtime, as a percent on the selected one of the communication channels at identified locations throughout the homeowner's residence 100. This unavailable airtime varies throughout the structure depending on the level of interference from the neighboring networks, e.g. WAP 132. Solid lines 304 and 306 show received signal strength (RSSI) in decibels referenced to one milliwatt, i.e. dBm, from neighboring WAP 132 and from cellular base station 120 respectively to the mobile diagnostic device at the identified locations throughout the residence. Best reception and highest throughput will be experienced at locations with the least interference and locations with highest permeability, i.e. least signal attenuation, relative to the proposed WAP positioned at identified location "B". The range of each identified location in feet is indicated by dimension lines 306 below the x axis.

FIGS. 4A and 4B are respectively a plan view of a home shown in FIG. 1 and a graph of wireless communication parameters obtained at identifiable locations, "B-F" within the home by an alternate embodiment of the diagnostic device of the current invention in which existing devices in the home are used to host and execute the diagnostic application and to perform the diagnostic functions thereof. Specifically, each existing device operative as a diagnostic device, harvests communication parameters, projects performance of a collocated proposed device and indicates the serviceability of the collocated device, e.g. wireless IPTV, wireless set top box or wireless security cameras. In this embodiment of the invention notebook computer 410 hosting and executing the diagnostic application: harvests communication parameters, projects the performance of wireless TV 110 using the harvested communication parameters, and indicates the serviceability of the collocated wireless TV. So also notebook computer 412: harvests communication parameters, projects the performance of wireless TV 112 using the harvested communication parameters, and indicates the serviceability of the collocated wireless TV 112. Similarly desktop computer 414: harvests, projects, and indicates the serviceability of the collocated wireless TV 114.

The graph 400 in FIG. 4B shows identified locations A-F on the x axis, airtime utilization on the y axis left side and throughput on the y axis right side. Dashed line segments, e.g. 402A, 402B show airtime utilization in percent as harvested by the associated one of the existing devices operative each operative as a diagnostic device. Airtime utilization, i.e. unavailable airtime, readings are taken on the selected one of the communication channels at the identified locations by the corresponding one of the existing wireless devices at the identified locations throughout the homeowner's residence 100. This unavailable airtime varies throughout the structure depending on the level of interference from the neighboring WAP 132. Solid line segments, e.g. 404A, 404B show throughput from the WAP 104 of the network being diagnosed, to each corresponding existing device operative as a diagnostic device at the identified locations throughout the residence. The range of each identified location in feet is indicated by dimension lines 406 below the x axis.

Figure 5B:
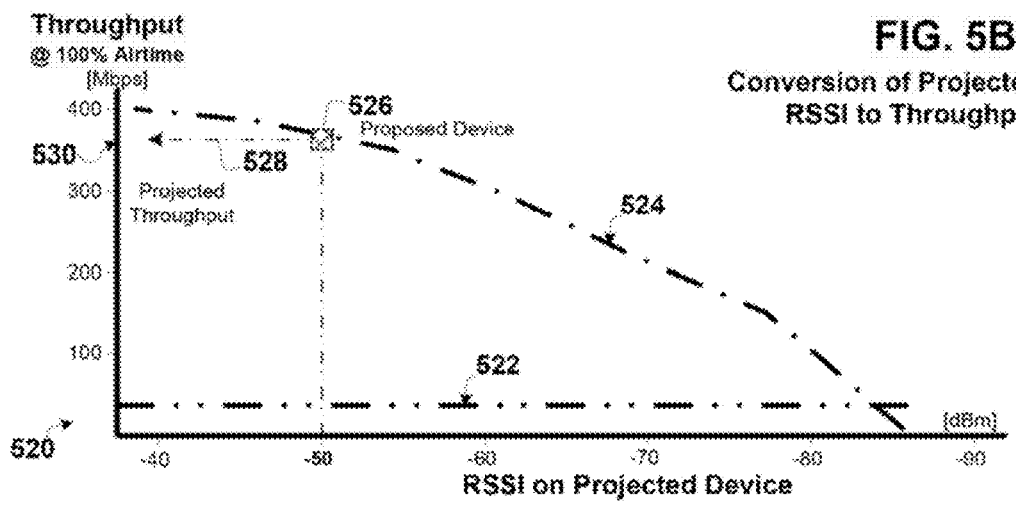
Figure 5C:
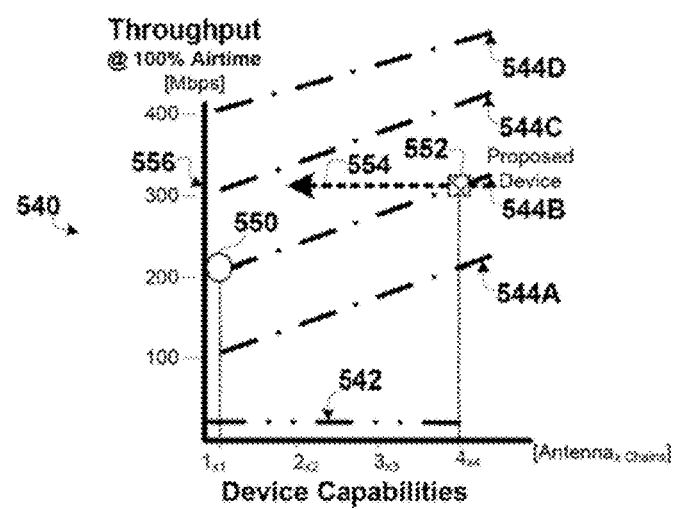

FIGS. 5A, 5B, 5C are graphs correlating parameters which identify relative differences in communication capabilities of the diagnostic apparatus and the at least one proposed wireless device.

FIG. 5A is a topographic graph 500 of RSSI on the y axis and device capabilities on the x axis, e.g. number of antennas and transceiver chains. Contour lines 502A-502D each indicate constant RSSI on the diagnostic device. The contour lines allow an RSSI measurement obtained on a wireless diagnostic device to be converted to the projected RSSI for the proposed device.

For example, if the diagnostic device has two antenna and two transceiver chains and measures an RSSI from the WAP at −60 dBm we identify that reading at reference 504, with a round bullet. If the proposed device has four antenna and four transceiver chains then to obtain its projected RSSI we move on the −60 dBm contour line to square bullet reference 506 which is the intersect of the 4×4 projected device capability with the −60 dBm contour line, and project 508 over to the intersect 510 with the y axis to identify the projected RSSI as −50 dBm. To convert this projected RSSI for the proposed 4×4 wireless to a raw throughput projection we proceed to FIG. 5B.

FIG. 5B is a line graph 520 of RSSI for the projected device on the x axis versus raw projected throughput, i.e. at 100% airtime availability, on the y axis. The dashed line 524 correlates RSSI with the maximum projected throughput for the projected device. There is a different graph for each projected device. The graphs can be derived empirically or theoretically. The dashed line 522 represents the required throughput for the proposed wireless device, e.g. TV, to deliver acceptable quality video.

For example, if we have identified the projected RSSI as −50 dBm then we mark the intersect 526 with line 524 with the square bullet and project 528 over to the intersect 530 with the y axis which is 360 Mbps. Although the projected throughput 530 exceeds the required throughput 522 the diagnostic process is not complete, requiring further refinement to account for airtime constraints, e.g. unavailable airtime, if any in a serviceability determination. The diagnostic device makes the serviceability determination as well.

FIG. 5C is a topographic graph 540 of throughput on the y axis and device capabilities on the x axis, e.g. number of antennas and transceiver chains. Contour lines 502A-502D each indicate constant throughput. The contour lines allow a throughput measurement obtained on a wireless diagnostic device to be converted to the projected throughput for the proposed device.

For example, if the diagnostic device has one antenna and one transceiver chain and measures a throughput from the WAP at 200 Mbps we identify that reading at reference 550, with a round bullet. If the proposed device has four antenna and four transceiver chains then to obtain its raw projected throughput we move on the 200 Mbps contour line to square bullet reference 552 which is the intersect of the 4×4 projected device capability with the 200 Mbps contour line, and project 554 over to the intersect 556 with the y axis to identify the projected raw throughput as 300 Mbps.

FIGS. 6A and 6B are respectively an isometric view of a mobile diagnostic device 102 and a graphical user interface 600 of a diagnostic application configured to execute thereon, in accordance with an embodiment of the current invention. FIG. 6A shows the mobile phone configured as a diagnostic device with the identified locations "B-F" shown in relation to the structure of the residence.

FIG. 6B shows an alternate embodiment of the graphical user interface (GUI) 601 in which the homeowner can evaluate different locations and types of wireless devices for serviceability. At each location the homeowner selects a proposed wireless device using the dropdown lists for selecting manufacturer 602 and make or model 604 for each proposed wireless device. Examples of proposed wireless devices which may be select from the dropdown lists 602-604 include: TVs, set top boxes, security cameras, wireless speakers, smoke detectors, wireless door bells, wifi enabled home appliances, wireless audio systems, wireless repeaters, wireless bridges, wifi enabled gaming consoles and wireless DVRs. As each proposed wireless device is added it shows up, e.g. TV 620, on the scroll bar 630 at the top of the GUI. As a location is identified it shows up on the GUI with a discrete round bullet indicator, e.g. bullet 612. At each location, e.g. location 612, the diagnostic application on the diagnostic device measures signal level 608 and available airtime 610 from the WAP 606. An arrow icon, e.g. arrow 614 graphically summarizes the quality of the link. These parameters are used to determine the projected communication parameters for each corresponding proposed wireless device, e.g. TV.

At the end of the walkthrough of the residence after all locations "A-H" are identified and all associated proposed wireless devices 620-626 are selected. The user is given the chance to select a mix of the wireless devices and locations using the checkbox feature 632. Once a mix is selected, the diagnostic device determines serviceability, and displays devices that will have throughputs that meet required performance levels with "Green" indicator of serviceability 642 and those for which projected throughput falls below required levels with red indicators 640. This allows the user to determine the best location for a given device or the best mix of devices to meet their needs.

FIGS. 7A, 7B, 7C and 7D are system diagrams of various systems for diagnosing a wireless home network in accordance with alternate embodiments of the invention.

FIG. 7A shows a typical new or pre-installation diagnostic environment as discussed above in connection with FIGS. 3A-3B. The cell/smart phone 702 configured as a diagnostic device performs the signal analysis throughout the structure 700 including signal strengths from either or both the neighboring WLAN, e.g. WAP 732, and the cell phone base station 720. The cell phone signal analysis also includes a determination of unavailable airtime from the neighboring networks, e.g. WAP 732. The diagnostic application further using the host cell phone's its built in location determination capability, determines the absolute placement of each identified location as well as distances between all WAP-Station links thereof. The cell phone then projects the performance of each proposed wireless device, and finally determines the serviceability thereof.

FIG. 7B shows another embodiment of a typical new or pre-installation diagnostic environment as discussed above in connection with FIGS. 2A-2B. The cell/smart phone 702 configured as a diagnostic device performs the signal analysis throughout the homeowner's structure 700 including signal strengths from homeowner's WAP 704. The cell phone signal analysis also includes a determination of unavailable airtime from the neighboring networks, e.g. WAP 732. The diagnostic application further using the host cell phone's built in location determination capability, determines the absolute placement of each identified location as well as distances between all WAP-Station links thereof. The cell phone then projects the performance of each proposed wireless device, and finally determines the serviceability thereof.

In another embodiment of the system shown in FIG. 7B both the cell phone and the WAP collaboratively perform the diagnostic functions. The cell phone for example performs location identification and signal analysis and the WAP completes the projection and serviceability determinations which are transferred to the cell phone for display to the homeowner.

FIG. 7C shows another embodiment of a typical post-installation network diagnostic for diagnosing a problem with an existing wireless device, for upgrading a wireless device, or for installing an additional new wireless device such as a TV as discussed above in connection with FIGS. 4A-4B. The cell/smart phone 702 configured as a diagnostic device performs the signal analysis throughout the homeowner's structure 700 including signal strengths from homeowner's WAP 704. The cell phone signal analysis also includes a determination of unavailable airtime from the neighboring networks, e.g. WAP 732. In an embodiment of the invention the cell phone associates with the WAP to enhance signal analysis. In this embodiment of the invention the WAP 704 harvests signal analysis itself as well as from each of its existing clients, 710, 712, 714 and shares these with the cell phone diagnostic application. The diagnostic application further using the host cell phone's its built in location determination capability, determines the absolute placement of each identified location as well as distances between all WAP-Station links thereof. The cell phone then uploads the signal analysis via the internet 750 to a Telco server 752 for further diagnostic processing, including projection and serviceability. These results may be downloaded to the cell phone for display to the homeowner, or may be made separately accessible for viewing by the homeowner on a website hosted by the Telco on the server 752.

FIG. 7D shows another embodiment of a typical post-installation network diagnostic for diagnosing a problem with an existing wireless device, for upgrading a wireless device, or for installing an additional new wireless device such as a TV as discussed above in connection with FIGS. 4A-4B. The WAP 704 configured as a diagnostic device performs the signal analysis throughout the homeowner's structure 700 as determined by itself and by its client stations 710, 712, 714. This collective signal analysis also includes a determination of unavailable airtime from the neighboring networks, e.g. WAP 732. The diagnostic application on the WAP 704 further uses the received signals at the WAP and the WAP's beamforming capability to determine at least the relative locations and estimated range to each of the client stations. The WAP then uploads the signal analysis via the internet 750 to a Telco server 752 for further diagnostic processing, including selection of proposed wireless devices or identification of alternate locations followed by projection and serviceability determinations for each. These inputs and results are accepted from and presented to the homeowner on a website hosted by the Telco on the server 752.

FIGS. 8A, 8B, 8C, 8D are hardware block diagrams of various devices configured to execute the diagnosis of a wireless home network in accordance with an embodiment of the current invention.

Figure 8A:
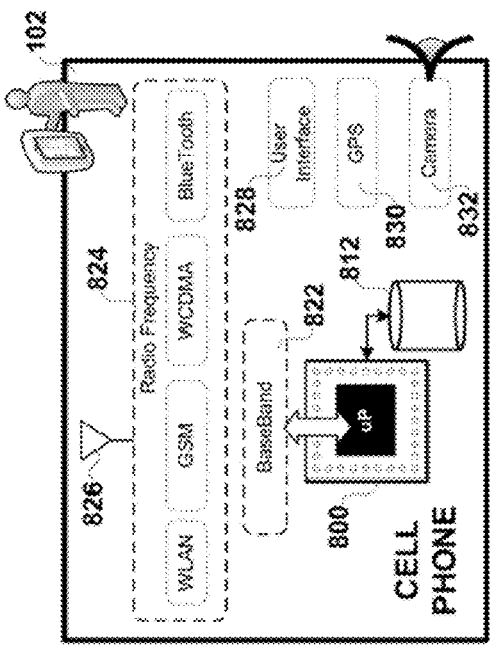
FIGS. 8A, 8B, 8C, 8D are hardware block diagrams of various devices configured to execute the diagnosis of a wireless home network in accordance with an embodiment of the current invention.

FIG. 8A shows a processor 800 and storage 812 configured to execute program code 818 associated with a WLAN diagnostic module 802 on one or more host devices. The diagnostic module includes a signal analyzer 804, a locator 806, a projector 808 and a serviceability sub-module 810. In addition to program code, the storage includes cross device lookup tables, graphs or functions 814, and stored signal analysis 816.

In operation the signal analyzer 804 harvests wireless communication parameters including signal level, device capabilities, and interference and stores those stats 816 in memory 812. The locator 806 uses host Global Positioning System (GPS), indoor positioning system, or more fine grained pedometer, accelerometer capabilities to determine identified locations. The projector 808 converts the signal analysis for the diagnostic host device to projected communication parameters for each proposed wireless device using the retrieved or stored cross device graphs, functions or lookup tables 814. The serviceability sub-module 810 determines the serviceability of the aggregate of one or more proposed wireless devices at each identified location is indicated to the user, and displays those to the homeowner on a graphical user display or other visual or audible output of the host device.

Figure 8C:
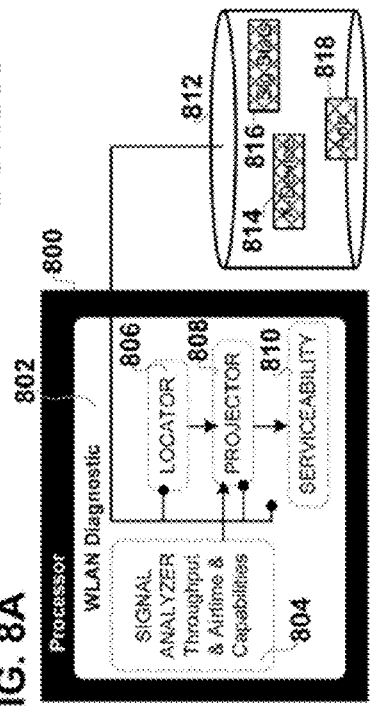
Figure 8B:
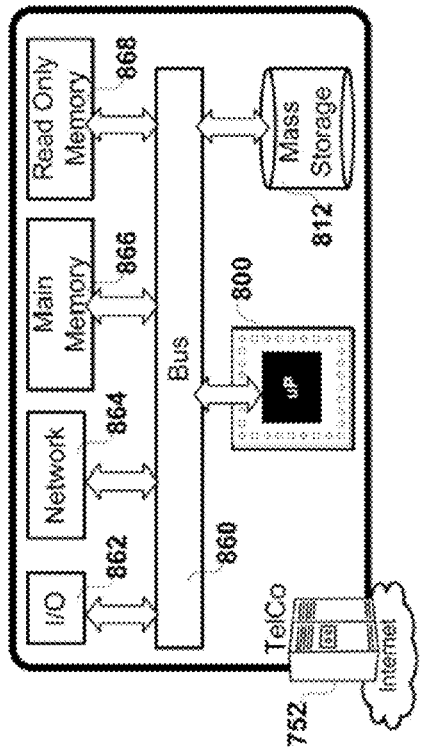

FIG. 8B shows a cell/smart phone configured as a host device. The cell phone 102 includes the processor 800 and storage 812; a base band stage 822, an radio frequency (Rf) stage 824 and an antenna 826. The processor in addition to supporting the cell phone functionality also executes the program code which provides wireless diagnostic functionality as discussed above including FIGS. 7A-7B. The cell phone RF stage supports traditional cellular communication standards such as: global system for mobile (GSM) and wide code division multiple access (w-CDMA), and also one or more IEEE 802.11 wireless local area network (WLAN) protocols. Blue Tooth is typically also supported. The cell phone also includes a global positioning system (GPS) module 830, a display or other user interface 828, and a camera 832.

FIG. 8C shows a wireless access point (WAP) configured as a host device. The WAP 104 includes the processor 800 and storage 812; a bus 844, a WLAN stage 846 including a base band stage 848, an radio frequency (Rf) stage 850 and antennas 852. The WAP also includes a modem 842 for coupling via copper or fiber to an Internet Service Provider (ISP). The processor in addition to supporting the WAP functionality also executes the program code which provides wireless diagnostic functionality as discussed in connection with FIGS. 7C-7D. The WAP RF stage supports traditional one or more IEEE 802.11 wireless local area network (WLAN) protocols.

Figure 8D:
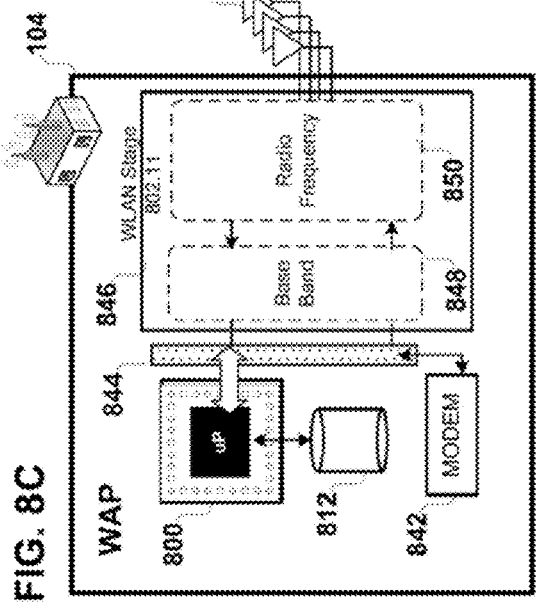

FIG. 8D shows a server configured as a host device. The server 752 includes the processor 800 and storage 812; a bus 860, a input/output (I/O) module 862 for interfacing with a user, a network module 864 for coupling to a network, a main memory 866 for storing and executing program code and data, a read only memory 868 for storing bootup program code. The processor in addition to supporting the server functionality also executes the program code which provides wireless diagnostic functionality as discussed in connection with FIGS. 7C-7D with the server configured to perform either or both the projection and serviceability diagnostic determinations.

FIG. 9 is a process flow diagram of processes associated with diagnosing a wireless home network in accordance with an embodiment of the invention. The wireless diagnostic processes including signal analysis 900, projection 940 and serviceability 960 may be executed on a single device or a system comprising multiple devices operating together as discussed above in connection with FIGS. 7A, 7B, 7C, 7D. The wireless diagnostic device in an embodiment of the invention is a cell phone or similar mobile device executing a diagnostic application downloaded from an application store and running on the user's cell phone and using the cell phones wireless local area network (WLAN) and positioning capability to provide input to the application.

These diagnostics allow a home owner, without the help of a Telco technician, to perform a sophisticated diagnostic of the readiness of a wireless home network for low latency services such as wireless HDTV using in an embodiment of the invention a downloaded diagnostic application running on the home owners cell phone for example. In another embodiment of the invention these diagnostics allow a home owner to diagnose post installation problems such as discovering why a wireless HDTV in the home is no longer exhibiting acceptable picture quality.

The first block of diagnostic processes is signal analysis block 900. In decision process 904 thereof a determination is made as to whether the diagnostic device can join or associate with an existing network. If the diagnostic device is associated with a wireless network then processing proceeds to process 906.

In process 906 the associated diagnostic processes harvest wireless communication parameters including: a) discovering the communication capabilities of any existing devices on the home's wireless network as well as b) harvesting any transmission parameters within the network as well as from neighboring networks. During harvesting each location at which harvesting takes place is identified.

In an embodiment of the invention location identification involves tagging the signal analysis with for example: a sequence number or letter, a keyword, graphic, picture or icon to identify the location of the diagnostic device at which the harvesting of wireless communication parameters takes place. Such tagging is in this embodiment of the invention is initiated by the user, via for example a screen tap, an audible input or a keyboard input on the graphical user interface of the diagnostic application displayed on a display screen of the diagnostic device. In an alternate embodiment of the invention location identification involves determining for each location at which signal analysis takes place the relative or absolute coordinates of the diagnostic device using for example the global positioning system (GPS) or more granular onboard positioning capabilities inherent in the cell/smart phone executing the diagnostic application.

In process 906 the associated diagnostic device discovers existing devices on the network and their communication capabilities by actively or passively scanning a selected one of the designated IEEE 802.11 . . . wireless communication channels for signal traffic. The beacon frame of a wireless access point (WAP) identifies the network as well as the capabilities of the WAP in the form of Information elements in the beacon frame. These information elements indicate WAP capabilities, e.g. service set identifier (SSID), # of antenna, beamforming support, coding and decoding, supported rates, and power levels. Once the SSID is known, other devices on the network can be identified by the diagnostic device.

In process 906 the associated diagnostic device also harvests throughput parameters between itself the associated WAP using for example repeated Internet Control Message Protocol (ICMP) Echo requests to measure throughput. In alternate embodiments of the invention the diagnostic device may derive throughput parameters indirectly by harvesting path loss, signal attenuation, or Phy rates from the WAP. Once throughput and device capabilities have been determined control passes to process 910.

If alternatively a determination is made in decision process 904 that the diagnostic device can't associate with an existing wireless network in the home or if the diagnostic device is being used in a home without a wireless network for a pre-installation diagnosis then processing proceeds to process 908.

In process 908 the diagnostic processes harvest wireless communication parameters including: a) discovering the communication capabilities of any existing devices on the wireless network if any as well as b) harvesting any transmission parameters within the network as well as from neighboring networks. During harvesting each location at which harvesting takes place is identified as discussed above.

If in process 908 there is an existing network but the wireless device is not associated with it, then the diagnostic device is still able to discover existing devices on the network and their communication capabilities by actively or passively scanning a selected one of the designated IEEE 802.11 . . . wireless communication channels used by the existing network for signal traffic including beacon frames and SSIDs as discussed above. The diagnostic device also harvests the signal strength, a.k.a. Received Signal Strength (RSSI) of the WAP's beacon at identifiable locations throughout the home.

Alternately, if in process 908 a pre-installation diagnostic is to be performed on a home without an existing network then the diagnostic device measures the permeability of the home to wireless signals at identified locations throughout the home using signals obtained on the communication channel(s) used by neighboring IEEE 802.11 wireless networks or in another embodiment of the invention from a Global System for Mobile (GSM) or Wideband Code Division Multiple Access (W-CDMA) cellular network if available to the diagnostic device. Received signal strength indications (RSSI) of these neighboring networks are obtained at the identified locations throughout the home. Once throughput and device capabilities have been determined control again passes to process 910.

In process 910 available and unavailable airtime are determined for each of the identified locations throughout the home. Unavailable airtime results from airtime utilization by neighboring networks using the same selected one of the IEEE 802.11 . . . communication channels as the home network being diagnosed. This 'interference' from neighboring networks is quantified over time to determine airtime unavailable due to same channel communications on neighboring networks. The remaining airtime is available 'Free' airtime. Once signal analysis is complete control passes to the next block of diagnostic processes.

The second block of diagnostic processes is the projection block 940. In this block of processes the communication parameters harvested on the cell phone as a diagnostic device are used to project the performance at the identified location of a proposed wireless device, e.g. a wireless TV or wireless set top box, or other device, e.g. WAP, or station within the wireless home network.

In process 942 a proposed wireless device is selected for analysis. In an embodiment of the invention such a device is selected by the user from a graphical user interface displayed by the diagnostic application running on the cell phone. Such devices may be specified by manufacturer, make, and model number. If the user wants to install a given manufacturer's wireless HDTV then the user selects that device from the diagnostic applications dropdown list. A different proposed device may be selected for each identified location, or in another embodiment of the invention the performance of the same proposed device may be evaluated at different identified locations to see which location will provide the best performance. In another embodiment of the invention a each proposed wireless device is selected programmatically.

Once a proposed device has been selected the relative performance offsets between it and the diagnostic device, e.g. cell phone are determined. In an embodiment of the invention such offset determination is made via device specific lookup tables, graphs, or functions from which relative differences in the communication capabilities, e.g. # antennas, beamforming support, decoding and coding and power, between the diagnostic and projected devices can be determined. In another embodiment of the invention such offset determination is made via inter-device lookup tables, graphs or functions which directly correlate a performance parameter on a given diagnostic device, e.g. cell phone, with performance on a similarly located proposed wireless device. In an embodiment of the invention such information is downloaded onto the cell phone during the installation of the application. In another embodiment of the invention such device specific offsets are retrieved over the Internet from a server maintained by the application provider, by a Telco or by reference to the manufacturers of each individual device for example.

Next in process 944 the communication parameters harvested on the diagnostic device are converted to projected communication parameters, e.g. projected raw throughput, for the proposed device using the stored or retrieved inter-device conversion parameters. Projected raw throughput refers to the maximum projected throughput assuming 100% airtime availability, i.e. no airtime constraints such as interference, overlapping channel usage on neighboring network(s) or overhead. In an embodiment of the invention these communication parameters are displayed to the user. After determining projected raw throughput for the proposed device, control is then passed to the next block of diagnostic processes.

The third block of diagnostic processes is the serviceability block 960. In this block of processes the serviceability of the aggregate of one or more proposed wireless devices at each identified location is indicated to the user, on a graphical user display or other visual or audible output.

Next, in process 962 the available airtime is determined for each node on the wireless network, e.g. WAP node and station nodes, including nodes associated with identified locations for each projected wireless device. Available airtime refers to the amount of time in a given time interval on a selected one of the plurality of IEEE 802.11 . . . communication channels available for wireless network communications expressed as a percentage. When the wireless network being diagnosed, shares a communication channel with a neighboring network the available airtime decreases in proportion to the unavailable airtime resulting from the neighboring network's usage thereof. So if a given node on the network being diagnosed experiences overlapping usage of the selected channel with a neighboring network then the node does not have 100% airtime availability.

Total Airtime @100%, less this unavailable airtime, less any required overhead Alpha ($\alpha$) is equal to net available airtime expressed as a percent. If for example the neighboring network is using the selected one of the wireless communication channels 40% of the time, and if the overhead $\alpha$ is 10%, then the net available airtime as calculated as follows. First gross available airtime is determined by taking the complement, i.e. (100%−unavailable airtime 'U' %) of the unavailable airtime as determined in process 910. If for example unavailable airtime was determined in process 910 to be 40% for a given location then the gross available airtime would be 60%. Next net airtime is determined by a downward adjustment of gross airtime to reflect network overhead as a %, i.e. (Gross Airtime)*(100%−Overhead %). If overhead alpha ($\alpha$) is 10% then in this example net airtime is 60%*90% or 54%.

Fifty-four percent represents the percentage of time in any given time interval that is available for contention based collision sense multiple access with collision avoidance (CSMA-CA) WLAN traffic on the wireless network being diagnosed. These net available airtime determinations are made for and may differ at each node in the network being diagnosed, e.g. the different locations associated with each node will experience different interference from a neighboring network.

In process 964 the maximum projected throughput is determined. Maximum projected throughput reflects the decrease in projected raw throughput as determined in process 944 which results from airtime constraints as calculated in process 962. Specifically maximum projected throughput equals the product of projected raw throughput and net available airtime.

Next in process 966 the required airtime as a percent is calculated for each proposed wireless device at each identified location. The required airtime is the portion of any given time interval needed to deliver content in the required amount to a proposed wireless device. Required airtime equals the quotient of the required throughput divided by the maximum projected throughput as determined in process 964. If a proposed wireless device, e.g. a wireless set top box for an HDTV has a maximum projected throughput of 50 Mbps but only requires 10 Mbps to deliver a visually flawless video stream, then the airtime requirements are 10/50 equals 20%.

Next in process 968 the required airtime is compared to the net available airtime at each station node and the aggregate required airtime is compared to the available airtime at the WAP node. Aggregate required airtime corresponds to the sum of the required airtime for all stations/clients and associated proposed wireless devices serviced by the WAP. Where either the required airtime at a client or the aggregate required airtime at the WAP exceeds the available airtime a corresponding link, (WAP>>ClientNode) is not serviceable. Where net available airtime exceeds both required airtime at a client node and aggregate required airtime at a WAP node then the link is serviceable.

The serviceability decision is made in decision process 970. In one embodiment of the invention the serviceability decision is made on a link by link basis. In another embodiment of the invention the serviceability decision is made for the entire mix of proposed wireless devices. In still another embodiment of the invention as shown in FIG. 6B the serviceability decision is made for the mix of proposed wireless devices selected by the user with each link rated on airtime requirements and possibly projected throughput rate or required throughput or signal level.

In the event of a negative serviceability determination control passes to process 972. In an embodiment of the invention recommendations are made as to alternate ones of the identified locations which offer improved throughput for one or more of the proposed wireless devices. These recommendations are based on the signal analysis harvested at each proximate one of the identified locations in process block 900. In an alternate embodiment of the invention recommendations are made as to alternate proposed devices whose superior communication capabilities are better suited to the airtime constraints associated with a given one of the identified locations, based on the signal analysis harvested at each proximate one of the identified locations in process block 900 and the projections in process block 940.

In the event of a positive serviceability determination control is passed to process 974 in which the serviceability of the proposed wireless device(s) is confirmed for the user, visually or audibly in an embodiment of the invention.

In an embodiment of the invention the processes associated with process blocks 900, 940 and 960 are executed exclusively on the diagnostic device. In an alternate embodiment of the invention the processes are executed collaboratively by any one of all of: the diagnostic device, a server coupled to the diagnostic device over the Internet, the network's WAP or a server coupled to the WAP of the network undergoing diagnosis.

Example 1

A Single Proposed Wireless Device

During signal analysis and projection one or more of: throughput, received signal strength indicator (RSSI), Phy data rate, or signal-to-noise ratio (SNR) are determined. Additionally the hardware capability of both the diagnostic device and the proposed wireless device(s) are determined for example: number of Rx/Tx chains; number of Rx/Tx antennas; operating frequency, e.g. 2.4 GHz or 5 ghz; operating channel; IEEE 802.11 operating mode, e.g. a, b, g, n or ac; Tx power; Multiple-Input Multiple-Output (MIMO) capability and coding capability, e.g. low density parity check (LDPC). A projection as to the performance of each proposed wireless device is made. The following is an example of this projection:

An RSSI of −70 dBm is measured on a diagnostic device with the following capabilities: 1×1 (Tx/RX), with 1 antenna, in 2.4 GHz band, channel 6, 11n mode, Tx power 21 dBm, no beamforming (BF) nor space time block coding (STBC) support, no low density parity check (LDPC).

The proposed wireless device has the following capabilities: 3×3 (Tx/Rx) with 2 antennas, in 5 Ghz band, channel 100, 11n mode, Tx power 18 dBm, with BF and LDPC capability.

Knowing the impact of each element from simulation or real test data, we use following conversion:

1×1→3×3 (+5 db)
2.4 GHz to 5 Ghz (−3 db)
Channel 6→channel 100 (0 db)
Tx power 21→18 (−3 db)
No BF→BF (+4 db)
Total=5−3+0−3+4=+3 db Therefore, the proposed wireless device will have 3 dB better performance than the diagnostic device and the RSSI will be around −67 dBm. A similar type of conversion can be used for SNR or Phy rate.

Example 2

Multiple Proposed Wireless Devices

Along with determining wireless communication parameters and device capabilities we can also use the mobile diagnostic device to scan environment to find neighboring network(s), other interference sources and the impact of these at each identified installation location. Captured information may include: airtime utilization, e.g. traffic level on the current selected wireless communication channel from neighboring network(s); RSSI of each neighboring network (from beacon); traffic level of other channel; list of all neighboring networks from service set identifiers (SSID); operating channel of each neighboring network. Higher channel duty cycle utilization percentage by neighboring networks results in lower available time for communication by current network. That means lower achievable throughput. So, if the mobile diagnostic device measures the utilization of the channel, while there is no traffic for current network, we can use that value to derive maximum projected throughput.

We make a projection using the measurements and estimated values to calculate maximum projected throughput for the location we were exploring. We have projected the RSSI for the proposed wireless device and we have the unavailable airtime, e.g. utilization, of the channel at this location. Therefore, the maximum projected throughput can be derived as: Maximum projected Throughput=(1−U)*(1−overhead ratio) Phy Rate where 'U' is the unavailable airtime resulting from utilization of channel by other networks. Phy rate for each location is derived based on the predicted RSSI for that location. There is a one-to-one mapping from RSSI to Phy rate. We perform the projection and serviceability determinations for each of three proposed wireless devices, e.g. HDTV set top boxes, at the desired installation locations and calculate the achievable throughput for each one of them. All these are recorded for this final step where we determine serviceability. The hardware configuration is similar to that discussed above. We explore a deployment scenario where the homeowner wants to install three wireless set top boxes in the home.

At location 1: RSSI −70 dBm and utilization of 25% is recorded on the mobile diagnostic device.

At location 2: RSSI −75 dBm and utilization of 20% is recorded on the mobile diagnostic device.

At location 3: RSSI −82 dBm and utilization of 0% is recorded on the mobile diagnostic device.

Converting RSSI is similar to the process shown above. We have projected RSSI of −67, −72 and −79 dBm. After projecting RSSI for each identified location, we need to derive Phy rate from RSSI. That can be calculated by using the pre-measured Phy rate versus RSSI table for the proposed wireless device that will be installed at each location. The following Table 1 provides such example:

TABLE 1

| Projected RSSI [dBm] | Phy Rate (Mbps) |
|---|---|
| −45 | 480 |
| −60 | 330 |
| −70 | 195 |
| −75 | 115 |
| −80 | 25 |
| −85 | 10 |

Using Table 1 and predicted RSSI of each location we will have projected raw Phy throughputs rates of: 200 mbps for location 1; 150 mbps for location 2; and 32 mbps for location 3.

Maximum projected throughput is determined using the projected raw Phy rates, overhead estimated at 10%, and available airtime information for each location: Achievable TP Location 1: (1−0.25)*(1−0.10)*200 mbps=135 mbps. Achievable TP Location 2: (1−0.20)*(1−0.10)*150 mbps=97.2 mbps. Achievable TP Location 3: (1−0.00)*(1−0.10)*32 mbps=28.8 mbps.

We arrive at maximum projected throughput rates at each location including reduction by appropriate amounts for airtime constraints including overhead and overlapping utilization of the selected communication channel by neighboring networks.

Next we evaluate the available airtime at the identified location for the WAP. The WAP needs to be quiet during this interval so that the mobile diagnostic device can identify traffic as coming from neighboring networks. The variable $U_{AP}$ represents the unavailable airtime due to overlapping channel utilization by a neighboring network in the identified location for the WAP.

At this step we need to see if all clients are being serviced by the WAP concurrently will there be enough airtime for the WAP to serve them all or not? For this we need to make sure the total available airtime used for all devices together, plus the airtime of the neighboring networks in same channel is less than 100%, which means service is possible. A overhead/confidence margin Alpha (α) can also be applied to avoid service interruption with minor changes in the network. Therefore, total airtime should stay below 100%−α.

To calculate the airtime required for each proposed device, a.k.a. client, we need to know the required throughput is for each client. For example, in an IPTV deployment, we need to know what the required throughput for best video quality is on the current network. We represent this rate by R. The final decision will be made based on the outcome of following equation:

$$\left(U_{AP} + \sum_{i=1}^{n} \frac{R}{TP_i}\right) < (1-\alpha)$$

where TPi is the maximum projected throughput for a device and Uap is the unavailable airtime at the WAP of the network being diagnosed. Thu: Tp@L1=135 Mbps, Tp@L2=97.2 Mbps and Tp@L3=28.8 Mbps. The required Video rate R is 10 mbps. Unavailable Airtime at the identified location of the WAP is $U_{WAP}$=0.1 or ten percent.

Total airtime=$U_{WAP}$+10/135+10/97.2+10/28.8=62.4% which is less than 1−α which means we can reliably provide service to the entire mix of proposed wireless devices at identified locations: L1, L2 and L3 at the required throughput rate of 10 mbps to each client. In an embodiment of the invention the mobile phone operative as a diagnostic device indicates wireless serviceability is "OK".

The components and processes disclosed herein may be implemented a software, hardware, firmware, or a combination thereof, without departing from the scope of the Claimed Invention.

The foregoing description of a preferred embodiment of the invention has been presented for purposes of illustration and description. It is not intended to be exhaustive or to limit the invention to the precise forms disclosed. Obviously many modifications and variations will be apparent to practitioners skilled in this art. It is intended that the scope of the invention be defined by the following claims and their equivalents.

What is claimed is:

1. A diagnostic apparatus for diagnosing a wireless home network, and the diagnostic apparatus comprising:
    a signal analyzer for analyzing wireless communication parameters at identifiable locations within a coverage area associated with the wireless home network;
    a throughput projector for projecting wireless throughput levels for at least one proposed wireless device differing in communication capabilities from the diagnostic apparatus at each of the identifiable locations, based on the wireless communication parameters analyzed by the signal analyzer together with parameters which identify relative differences in communication capabilities of the diagnostic apparatus and the at least one proposed wireless device.

2. The diagnostic apparatus of claim 1, further comprising:
    the signal analyzer further configured to determine on a selected one of a plurality of wireless communication channels of the wireless home network airtime unavailable due to interference as well as remaining available airtime; and a serviceability module to determine the serviceability of the at least one proposed wireless device by comparing the airtime required by the at least one proposed device to the available airtime.

3. The diagnostic apparatus of claim 1, further comprising:
a serviceability module to determine the serviceability of the at least one proposed wireless device by comparing the airtime required by the at least one proposed device to the available airtime and to recommend alternate ones of the indicated locations for the at least one proposed wireless device in the event of a negative serviceability determination.

4. The diagnostic apparatus of claim 1, further comprising:
a serviceability module to determine the serviceability of the at least one proposed wireless device by comparing the airtime required by the at least one proposed device to the available airtime and to recommend alternate wireless devices in the event of a negative serviceability determination.

5. The diagnostic apparatus of claim 1, further comprising:
a serviceability module to determine the serviceability of the plurality of proposed wireless devices based on an aggregate of each proposed wireless device's airtime requirements in relation to total available airtime.

6. The diagnostic apparatus of claim 1, further comprising:
a locator to locate at least the relative positions of the at least one proposed wireless device at the identifiable locations within the coverage area of the wireless home network; and
a serviceability module to determine an optimal one of the identifiable locations for installation of the at least one proposed wireless device within the wireless home network.

7. The diagnostic apparatus of claim 1, further comprising:
a serviceability module to determine the serviceability of the plurality of proposed wireless devices based on an aggregate of each proposed wireless device's airtime requirements in relation to total available airtime, and
a display for presenting a graphical user interface allowing a user to input differing mixes among the plurality of proposed wireless devices and to view output from the serviceability module as to the serviceability of each mix.

8. The diagnostic apparatus of claim 1, further comprising:
a memory for storing the parameters which identify relative differences in communication capabilities of the diagnostic apparatus and the at least one proposed wireless device.

9. The diagnostic apparatus of claim 1 wherein the diagnostic apparatus comprises one of: a cell phone, a smart phone, a tablet computer, a notebook computer and a desktop computer.

10. A method for diagnosing a wireless home network, and the method comprising:
analyzing wireless communication parameters harvested by a first wireless device at identifiable locations within a coverage area associated with the wireless home network;
projecting wireless throughput levels for a proposed wireless device differing in communication capabilities from the first wireless device at each of the identifiable locations, based on the wireless communication parameters analyzed in the analyzing act together with parameters which identify the relative differences in communication capabilities of the first wireless device and the proposed wireless device.

11. The method for diagnosing a wireless home network of claim 10, further comprising:
determining on a selected one of a plurality of wireless communication channels of the wireless home network airtime unavailable due to interference as well as remaining available airtime; and
determining a serviceability of the at least one proposed wireless device by comparing airtime required by the at least one proposed device to available airtime.

12. The method for diagnosing a wireless home network of claim 10, further comprising:
determining a serviceability of the at least one proposed wireless device by comparing airtime required by the at least one proposed device to available airtime; and
recommending alternate ones of the indicated locations for the at least one proposed wireless device in the event of a negative serviceability determination.

13. The method for diagnosing a wireless home network of claim 10, further comprising:
determining a serviceability of the at least one proposed wireless device by comparing airtime required by the at least one proposed device to available airtime; and
recommending alternate wireless devices in the event of a negative serviceability determination.

14. The method for diagnosing a wireless home network of claim 10, further comprising:
determining a serviceability of the plurality of proposed wireless devices based on an aggregate of each proposed wireless device's airtime requirements in relation to total available airtime.

15. The method for diagnosing a wireless home network of claim 10, further comprising:
identifying at least the relative positions of the at least one proposed wireless device at the identifiable locations within the coverage area of the wireless home network; and
determining an optimal one of the identifiable locations for installation of the at least one proposed wireless device within the wireless home network.

16. The method for diagnosing a wireless home network of claim 10, further comprising:
determining a serviceability of the plurality of proposed wireless devices based on an aggregate of each proposed wireless device's airtime requirements in relation to total available airtime, and
displaying a graphical user interface allowing a user to input differing mixes among the plurality of proposed wireless devices and to view output as to the serviceability of each mix as determined in the determining act.

17. The method for diagnosing a wireless home network of claim 10, further comprising:
parameterizing relative differences in throughput resulting from differences in communications capabilities of the diagnostic apparatus and the at least proposed wireless device.

18. The method for diagnosing a wireless home network of claim 10, further comprising:
performing the analyzing and projecting acts on at least one of: the first wireless device, a wireless access point (WAP) and a server accessible over the Internet.

19. A non-transient computer readable medium containing program instructions for causing a computer to perform the method of:

analyzing wireless communication parameters harvested by a first wireless device at identifiable locations within a coverage area associated with the wireless home network;

projecting wireless throughput levels for a proposed wireless device differing in communication capabilities from the first wireless device at each of the identifiable locations, based on the communication parameters analyzed in the analyzing act together with parameters which identify the relative differences in communication capabilities of the first wireless device and the proposed wireless device.

20. The non-transient computer readable medium containing program instructions of claim 19 for causing a computer to perform the method of:

determining on a selected one of a plurality of wireless communication channels of the wireless home network airtime unavailable due to interference as well as remaining available airtime; and determining a serviceability of the at least one proposed wireless device by comparing airtime required by the at least one proposed device to available airtime.

\* \* \* \* \*